United States Patent
Shin et al.

(10) Patent No.: US 9,461,331 B2
(45) Date of Patent: Oct. 4, 2016

(54) METHOD OF PREPARING AN OXIDE-BASED SOLID ELECTROLYTE BY A HYDROTHERMAL REACTION

(71) Applicant: Electronics and Telecommunications Research Institute, Daejeon (KR)

(72) Inventors: Dong Ok Shin, Daejeon (KR); Young-Gi Lee, Daejeon (KR); Kwang Man Kim, Daejeon (KR); Kunyoung Kang, Daejeo (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 230 days.

(21) Appl. No.: 14/274,675

(22) Filed: May 9, 2014

(65) Prior Publication Data

US 2015/0010829 A1 Jan. 8, 2015

(30) Foreign Application Priority Data

Jul. 5, 2013 (KR) .................. 10-2013-0079266
Nov. 28, 2013 (KR) .................. 10-2013-0146370

(51) Int. Cl.
*H01M 6/18* (2006.01)
*H01M 10/0562* (2010.01)
*C01G 25/00* (2006.01)
*C01G 33/00* (2006.01)
*C01G 35/00* (2006.01)

(52) U.S. Cl.
CPC ........ *H01M 10/0562* (2013.01); *C01G 25/006* (2013.01); *C01G 33/006* (2013.01);

(Continued)

(58) Field of Classification Search
CPC .............. H01M 10/0562; H01M 2300/0071; C01G 35/006; C01G 33/006; C01G 25/006
USPC ................................................ 429/305
See application file for complete search history.

(56) References Cited

U.S. PATENT DOCUMENTS 8,658,317 B2   2/2014   Weppner et al.

FOREIGN PATENT DOCUMENTS

KR   10-2010-0053543 A   5/2010
KR   10-2012-0039447 A   4/2012

OTHER PUBLICATIONS

Masashi Kotobuki, et al., "Fabrication of all-solid-state lithium battery with lithium metal anode using $Al_2O_3$-added $Li_7La_3Zr_2O_{12}$ solid electrolyte", Journal of Power Sources, vol. 196, No. 18, pp. 7750-7754, Sep. 15, 2011.

(Continued)

*Primary Examiner* — Gary Harris
(74) *Attorney, Agent, or Firm* — Rabin & Berdo, P.C.

(57) ABSTRACT

A method of preparing an oxide-based solid electrolyte includes preparing a precursor solution which includes a lanthanide complex and a metal complex; preparing an intermediate by a hydrothermal reaction that is performed on the precursor solution; adding a lithium compound and a dopant precursor to the intermediate to prepare a mixture; and crystallizing the mixture. The mixture is crystallized by preparing a first oxide-based solid electrolyte by performing a first crystallization process on the mixture; and preparing a second oxide-based solid electrolyte by performing a second crystallization process on the first oxide-based solid electrolyte, wherein the second oxide-based solid electrolyte has a stoichiometric composition that is the same as that of the first oxide-based solid electrolyte, but that has a different crystal structure.

9 Claims, 2 Drawing Sheets

(52) U.S. Cl.
CPC ......... *C01G35/006* (2013.01); *C01P 2002/52* (2013.01); *C01P 2006/40* (2013.01); *H01M 2300/0071* (2013.01)

(56) References Cited

OTHER PUBLICATIONS

Ramaswamy Murugan, et al., "Fast Lithium Ion Conduction in Garnet-Type $Li_7La_3Zr_2O_{12}$", Angew. Chem. Int. Ed., vol. 46, No. 41, pp. 7778-7781, Oct. 15, 2007.

Venkataraman Thangadurai, et al., "Novel Fast Lithium Ion Conduction in Garnet-Type $Li_5La_3M_2O_{12}$(M=Nb, Ta)", Journal of American Ceramic Society, vol. 86, No. 3, pp. 437-440, Mar. 2003.

I. Kokal, et al., "Sol-gel synthesis and lithium ion conductivity of $Li_7La_3Zr_2O_{12}$ with garnet-related type structure", Solid State Ionics, vol. 185, pp. 42-46, Mar. 11, 2011.

Jiajia Tan, et al., "Synthesis of Cubic Phase $Li_7La_3Zr_2O_{12}$ Electrolyte for Solid-State Lithium-Ion Batteries", Electrochemical and Solid-State Letters, vol. 15, No. 3, pp. A37-A39, Dec. 28, 2012.

METHOD OF PREPARING AN OXIDE-BASED SOLID ELECTROLYTE BY A HYDROTHERMAL REACTION

CROSS-REFERENCE TO RELATED APPLICATIONS

This U.S. non-provisional patent application claims priority under 35 U.S.C. §119 of Korean Patent Application Nos. 10-2013-0079266, filed on Jul. 5, 2013, and 10-2013-0146370, filed on Nov. 28, 2013, the entire contents of which are hereby incorporated by reference.

BACKGROUND

The present invention disclosed herein relates to lithium batteries, and more particularly, to methods of preparing an oxide-based solid electrolyte by a hydrothermal reaction.

Interests in lithium batteries have significantly grown as the importance of energy storage and conversion techniques has increased. Lithium batteries may include an anode, a separator, a cathode, and an electrolyte. The electrolyte acts as a medium in which ions may move between the cathode and the anode. Since energy densities of the lithium batteries may be relatively higher than those of other types of batteries and miniaturization and weight reduction of the lithium batteries may be possible, research and development of lithium batteries as power sources of portable electronic devices have been actively conducted. Recently, in line with the improvement of the performance of the portable electronic devices, power consumed in the portable electronic devices has increased. Lithium batteries are required to generate high power. As a result, a lithium battery electrolyte is required to have high ionic conductivity and low electrical conductivity.

The lithium battery electrolyte may include an organic-based liquid electrolyte and an inorganic-based solid electrolyte. The organic-based liquid electrolyte has a lithium salt dissolved therein and is widely used due to high ionic conductivity and stable electrochemical properties. However, a number of issues related to the safety of the organic-based liquid electrolyte have been raised due to its flammability, volatility, and leakage problem. Lithium batteries including the inorganic-based solid electrolyte may have freedom of cell design. Also, the inorganic-based solid electrolyte may have excellent stability because fire and explosion due to a decomposition reaction of an electrolyte solution are prevented.

SUMMARY

The present invention provides a method of preparing an oxide-based solid electrolyte having high purity and ionic conductivity.

The object of the present invention is not limited to the aforesaid, but other objects not described herein will be clearly understood by those skilled in the art from descriptions below.

Embodiments of the present invention provide methods of preparing an oxide-based solid electrolyte including: preparing a precursor solution which includes a lanthanide complex and a metal complex; preparing an intermediate by a hydrothermal reaction that is performed on the precursor solution; adding a lithium compound and a dopant precursor to the intermediate to prepare a mixture; and crystallizing the mixture.

In some embodiments, the hydrothermal reaction of the precursor solution may be performed in a temperature range of 120° C. to 240° C. for 2 hours to 48 hours.

In other embodiments, the preparing of the precursor solution may include: preparing a precursor solution by adding the lanthanide complex and the metal complex to an acidic aqueous solution; and forming precursor precipitates by adding a mineralizer to the precursor solution.

In still other embodiments, the crystallizing of the mixture includes: preparing a first oxide-based solid electrolyte by performing a first crystallization process on the mixture; and preparing a second oxide-based solid electrolyte by performing a second crystallization process on the first oxide-based solid electrolyte, wherein the second oxide-based solid electrolyte may have the same stoichiometric composition as the first oxide-based solid electrolyte, but may have a different crystal structure.

In even other embodiments, the second oxide-based solid electrolyte may have a higher ionic conductivity than the first oxide-based solid electrolyte.

In yet other embodiments, the first oxide-based solid electrolyte may have a tetragonal phase, and the second oxide-based solid electrolyte may have a cubic phase.

In further embodiments, the second oxide-based solid electrolyte may have a chemical formula of $Li_{x-y}La_3M_2O_{12-y}$, where x is 5 or 7, y is 0.3 to 0.7, and M is any one selected from the group consisting of tantalum, niobium, zirconium, and a combination thereof.

In still further embodiments, the first crystallization process may be performed in a temperature range of 700° C. to 900° C. for 6 hours to 12 hours.

In even further embodiments, the second crystallization process may be performed in a temperature range of 1000° C. to 1100° C. for 6 hours to 12 hours.

In yet further embodiments, the dopant precursor may include at least one selected from the group consisting of aluminum, germanium, silicon, gallium, indium, tin, and antimony.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE EMBODIMENTS

Figure 1:
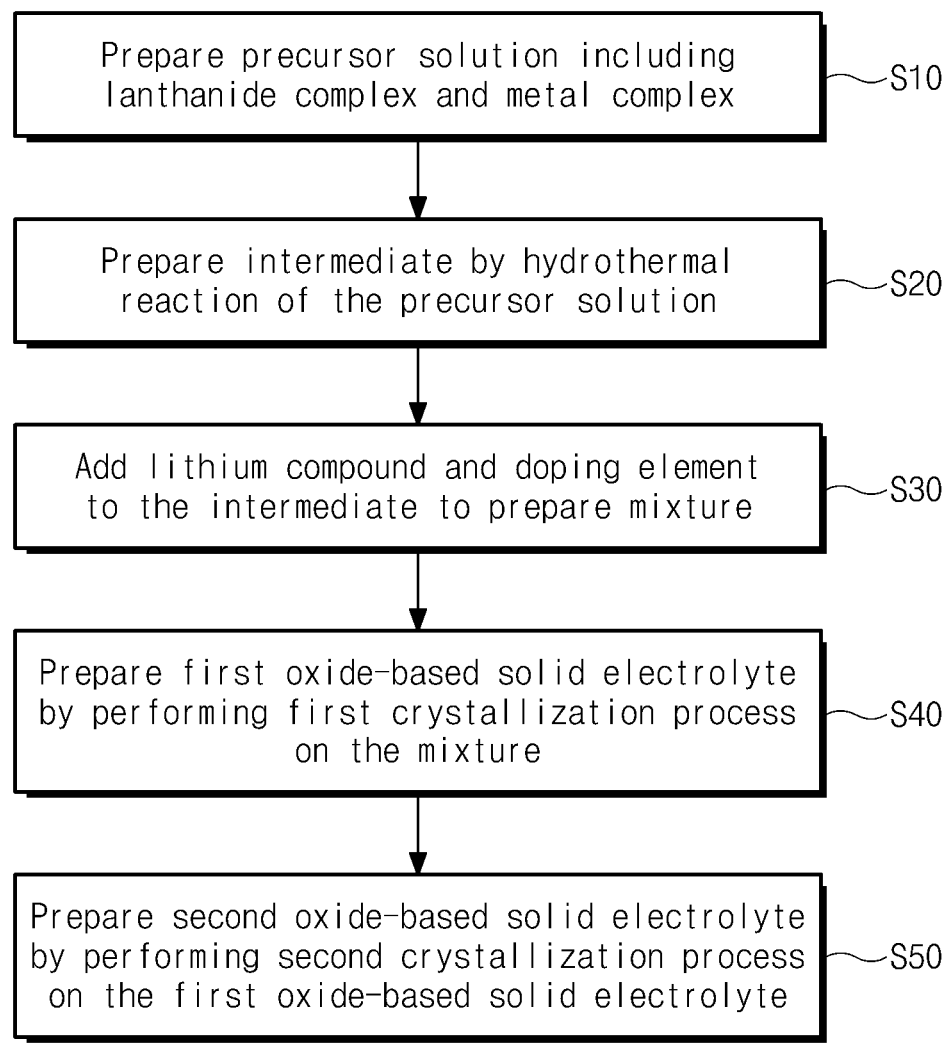
FIG. 1 is a flowchart illustrating a method of preparing an oxide-based solid electrolyte according to an embodiment of the present invention.

Preferred embodiments of the present invention will be described below in more detail with reference to the accompanying drawings in order to fully understand the constitution and effect of the present invention. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Those skilled in the art will understand that the present inventive concept can be implemented in an appropriate environment.

In the following description, the technical terms are used only for explaining a specific exemplary embodiment while not limiting the present invention. The terms of a singular form may include plural forms unless referred to the contrary. The meaning of "comprises" and/or "comprising" specifies a property, a region, a fixed number, a step, a process, an element and/or a component but does not exclude other properties, regions, fixed numbers, steps, processes, elements and/or components.

In addition, it will be understood that when an element such as a layer, film, region, or substrate is referred to as being "on" another element, it can be directly on the other element or intervening elements may also be present.

Also, though terms like a first, a second, and a third are used to describe various regions and layers in various embodiments of the present invention, the regions and the layers are not limited to these terms. These terms are used only to discriminate one region or layer from another region or layer. Therefore, a layer referred to as a first layer in one embodiment can be referred to as a second layer in another embodiment. An embodiment described and exemplified herein includes a complementary embodiment thereof. Like reference numerals refer to like elements throughout.

Unless otherwise defined, all terms used herein have the same meaning as commonly understood by one of ordinary skill in the art to which this inventive concept belongs.

FIG. 1 is a flowchart illustrating a method of preparing an oxide-based solid electrolyte according to an embodiment of the present invention.

Referring to FIG. 1, a precursor solution may be prepared by mixing a metal complex and a lanthanide complex (S10). For example, the metal complex may be added to an acidic aqueous solution. The metal complex may be a zirconium complex, a tantalum complex, or a niobium complex. For example, the metal complex may be zirconium dinitrate oxide hydrate. 1 M nitric acid ($HNO_3$) aqueous solution may be used as the acidic aqueous solution. The metal complex and the acidic aqueous solution may be mixed to form a metal complex solution. For example, the metal complex and the acidic aqueous solution may be mixed by stirring at a temperature ranging from 50° C. to 60° C. The metal complex solution may be transparent. The lanthanide complex may be added to the metal complex solution. For example, lanthanum nitrate may be used as the lanthanide complex. In this case, a molar ratio of the metal complex to the lanthanide complex may be 3:2. A precursor solution may be prepared by mixing the lanthanide complex and the metal complex solution. For example, the lanthanide complex and the metal complex solution may be mixed by stirring at a temperature ranging from 50° C. to 60° C. The precursor solution may be transparent. The precursor solution may include lanthanide cations and metal cations. For example, the precursor solution may include $La^{+3}$ ions and $Zr^{+4}$ ions.

A mineralizer may be added to the precursor solution. For example, a sodium hydroxide solution and/or an ammonium hydroxide solution may be used as the mineralizer. The mineralizer may provide anions, for example, hydroxide ions (OH), to the precursor solution. A pH value of the precursor solution may be adjusted to about 8 to about 9. The lanthanide cations (e.g., $La^{+3}$) and the metal cations (e.g., $Zr^{+4}$) may be combined with the anions ($OH^-$) that are provided by the mineralizer. As a result, precursor precipitates may be prepared from the precursor solution. For example, the precursor precipitates may include lanthanide hydroxide (e.g., lanthanum hydroxide, $La(OH)_3$) and metal hydroxide ($M(OH)_y$, e.g., zirconium hydroxide).

A hydrothermal reaction may be performed using the precursor precipitates (S20). The expression "hydrothermal reaction" may denote a synthesis reaction of a material that is performed in the state of an aqueous solution under conditions of high temperature and high pressure. The hydrothermal reaction may be performed under a temperature condition of about 140° C. to about 250° C. In the case that the hydrothermal reaction is performed at a temperature lower than 140° C., a first intermediate may not be formed. In the case in which the hydrothermal reaction is performed at a temperature higher than 250° C., a size or shape of the synthesized first intermediate may be non-uniform. The hydrothermal reaction may be performed for about 8 hours to about 36 hours. In the case that the hydrothermal reaction is performed for less than 8 hours, the first intermediate formed may be excessively small or may have a non-uniform particle size. In the case in which the hydrothermal reaction is performed for greater than 36 hours, the first intermediate formed may be excessively large or may have a non-uniform particle size. The first intermediate may be washed. In this case, high purity alcohol or distilled water may be used. The cleaned first intermediate may be dried. A drying process may be performed in a temperature range of 100° C. to 120° C. using an oven. The intermediate may have a relatively small and uniform size. For example, the intermediate may have a diameter of 15 nm to 20 nm. The intermediate may have a length of 180 nm to 200 nm With respect to the intermediate prepared by the hydrothermal reaction, a lanthanide element and a metallic element may be uniformly mixed.

A lithium compound and a dopant precursor may be added to the intermediate to form a mixture (S30). A heat treatment may be performed on the first intermediate before adding the lithium compound and the dopant precursor. The heat treatment of the first intermediate may be performed in a temperature range of 300° C. to 400° C. Impurities included in the first intermediate may be removed by the heat treatment of the first intermediate. As a result, the prepared oxide-based solid electrolyte may have high purity. The lithium compound may be any one selected from the group consisting of lithium acetate, lithium nitrate, lithium chloride, lithium hydroxide, and lithium oxide. The lithium compound may be $Li_2CO_3$, LiOH, or $LiNO_3$, and for example, may be $Li_2CO_3$. The lithium compound may not include a metal other than lithium in order to prevent the inclusion of the impurities. The dopant precursor may be a salt including a doping element. The dopant precursor may be acetate, nitrate, chloride, hydroxide, or oxide. For example, the doping element of the doping precursor may include at least one selected from the group consisting of aluminum, germanium, silicon, gallium, indium, tin, and antimony. The doping element may have the same or similar atomic diameter as a lithium element. The lithium compound and the dopant precursor may be mixed with the intermediate to prepare a mixture. The mixing process may be performed by mechanical mixing, for example, a ball milling method. In this case, isopropyl alcohol may be further added to the intermediate to prepare a more uniform mixture. A lithium element, a lanthanide element, a metal element, and an oxygen element may be uniformly distributed in the mixture.

A first oxide-based solid electrolyte may be formed by a first crystallization process of the mixture (S40). The first crystallization process may include a heat treatment of the mixture. The lithium element may diffuse between the lanthanide element and the metallic element by the first crystallization process, and thus, the first oxide-based solid electrolyte may be formed. The first oxide-based solid electrolyte may have a tetragonal phase. Stoichiometric composition and crystallinity of the first oxide-based solid electrolyte may be determined by first crystallization process conditions. The first crystallization process may be performed in a temperature range of 700° C. to 900° C. In the case that the first crystallization process is performed at a temperature lower than 700° C., the first oxide-based solid electrolyte having the tetragonal phase may not be formed. In the case in which the first crystallization process is performed at a temperature higher than 900° C., the first oxide-based solid electrolyte may be excessively deficient in the lithium element. The first crystallization process may be performed for 6 hours to 12 hours. In the case that the first crystallization process is performed for less than 6 hours, the first oxide-based solid electrolyte may have poor crystallinity. In the case in which the first crystallization process is performed for greater than 12 hours, an amount of the lithium element, which is lost during the heat treatment, may increase. As a result, the first oxide-based solid electrolyte may be prepared in low yield. The first oxide-based solid electrolyte of the present invention may have a chemical formula of $Li_{x-y}La_3M_2O_{12-y}$ (where x is 5 or 7, y is 0.3 to 0.7, and M is any one selected from the group consisting of tantalum (Ta), niobium (Nb), zirconium (Zr), and a combination thereof). The lithium element, the lanthanide element, the metal element, and the oxygen element may be uniformly distributed in the first oxide-based solid electrolyte. The doping element may be substituted with the lithium element included in the first oxide-based solid electrolyte by the first crystallization process. The doping element may be more easily substituted with the lithium element as the doping element has a size similar to that of the lithium element. The first oxide-based solid electrolyte including the doping element may have higher ionic conductivity.

A second oxide-based solid electrolyte may be formed by performing a second crystallization process on the first oxide-based solid electrolyte (S50). The second oxide-based solid electrolyte may have the same stoichiometric composition as the first oxide-based solid electrolyte, but may have a different crystal structure. For example, the second oxide-based solid electrolyte may have a cubic phase. The second oxide-based solid electrolyte may have a higher ionic conductivity than the first oxide-based solid electrolyte. For example, the second oxide-based solid electrolyte may have an ionic conductivity that is $10^2$ times or more higher than that of the first oxide-based solid electrolyte. The second crystallization process may be performed in a temperature range of 1000° C. to 1100° C. In the case that the second crystallization process is performed at a temperature lower than 1000° C., the second oxide-based solid electrolyte having a cubic structure may not be formed. In the case in which the second crystallization process is performed at a temperature higher than 1100° C., the second oxide-based solid electrolyte may be prepared in low yield. For example, an amount of impurities in the second oxide-based solid electrolyte may increase or the second oxide-based solid electrolyte may be excessively deficient in the lithium element. The second crystallization process may be performed for 6 hours to 12 hours. In the case that the second crystallization process is performed for less than 6 hours, the crystallinity of the second oxide-based solid electrolyte may be poor. In the case in which the second crystallization process is performed for greater than 12 hours, an amount of the lithium element, which is lost during the heat treatment, may increase, and thus, the yield of the second oxide-based solid electrolyte may be low. The lithium element may evaporate in the first and second crystallization processes. Accordingly, in the above-described operation S30, the lithium compound may be further added in an amount of about 10% of the stoichiometric amount of the lithium element that is included in the oxide-based solid electrolyte. The second oxide-based solid electrolyte prepared through the first and second crystallization processes may further prevent lithium element deficiency in comparison to the case in which the first crystallization process is omitted. As another example, the shape of the first oxide-based solid electrolyte may be adjusted before performing the second crystallization. For example, the first oxide-based solid electrolyte may be prepared as pellets. Since the first oxide-based solid electrolyte is prepared in the state of solid powder, a shape or size of the first oxide-based solid electrolyte pellet may be easily controlled. The shape or size of the first oxide-based solid electrolyte pellet may be adjusted to be suitable for a lithium battery.

The second oxide-based solid electrolyte prepared according to the present invention may have a chemical formula of $Li_{x-y}La_3M_2O_{12-y}$ (where x is 5 or 7, y is 0.3 to 0.7, and M is any one selected from the group consisting of Ta, Nb, Zr, and a combination thereof). The second oxide-based solid electrolyte may include a doping element that is substituted into a lithium element site. The doping element may be included in an amount range of about 0.00001 wt % to about 5 wt % based on the oxide-based solid electrolyte. The second oxide-based solid electrolyte including the doping element may exhibit high ionic conductivity.

Hereinafter, the preparation of the oxide-based solid electrolyte according to the present invention and the results of the characterization of the oxide-based solid electrolyte will be described in more detail with reference to experimental examples of the present invention.

Preparation of Oxide-Based Solid Electrolyte

Experimental Example 1-1

(Preparation of Intermediate by Hydrothermal Reaction)

Zirconium dinitrate oxide hydrate and lanthanum nitrate were added at a molar ratio of 3:2 to a 1 M nitric acid ($HNO_3$) aqueous solution. Zirconium dinitrate oxide hydrate and lanthanum nitrate were in the state of a powder. A stirring process using a hot plate was performed on the aqueous solution until the aqueous solution became transparent. Thus, a precursor solution was prepared. A sodium hydroxide aqueous solution and an ammonia aqueous solution were added to the precursor solution until a pH value of the precursor solution was obtained in a range of 8 to 9. In this case, precipitates were formed in the precursor solution. The precursor solution was heat treated at 200° C. for 20 hours to perform a hydrothermal reaction of the precursor solution. A synthesized intermediate was washed using high purity alcohol and distilled water. The washed intermediate was dried at 100° C. $LiCO_3$ was added to the intermediate to obtain a molar ratio of lithium (Li):lanthanum (La): zirconium (Zr) of 7.7:3:2. A second intermediate was formed by adding aluminum to the intermediate to which $LiCO_3$ was added. A weight of the aluminum added was 1 wt % of the second intermediate.

(Preparation of Solid Electrolyte)

The second intermediate was heat treated at 900° C. for 6 hours. A first oxide-based solid electrolyte prepared was ground. The ground first oxide-based solid electrolyte was introduced into a mold. The first oxide-based solid electrolyte was prepared in a pellet form by pressing the mold. The first oxide-based solid electrolyte pellet thus prepared has a diameter of 10 mm and a thickness of 2 mm The first oxide-based solid electrolyte pellet was heat treated at 1100° C. for 12 hours to prepare a second oxide-based solid electrolyte in a pellet form.

Experimental Example 1-2

A second oxide-based solid electrolyte in a pellet form was prepared in the same manner as in Experimental Example 1-1. However, in the present experiment, germanium was used instead of aluminum.

Experimental Example 1-3

A second oxide-based solid electrolyte in a pellet form was prepared in the same manner as in Experimental Example 1-1. However, in the present experiment, tin was used instead of aluminum.

COMPARATIVE EXAMPLE 1-1

Preparation of Oxide-based Solid Electrolyte by Solid Phase Method (Preparation of Intermediate)
Zirconium dinitrate oxide hydrate, lanthanum nitrate, and $LiCO_3$ were prepared to obtain a molar ratio of Li:La:Zr of 7.7:3:2. The zirconium dinitrate oxide hydrate, lanthanum nitrate, and $LiCO_3$ were mixed by a ball mill method. The zirconium dinitrate oxide hydrate, lanthanum nitrate, and $LiCO_3$ used were in the form of a powder, respectively.
(Preparation of Solid Electrolyte)
The intermediate thus prepared was heat treated at a temperature of 900° C. for 6 hours to form a first product. The first product was ground. A second product was prepared by heat treating the ground first product at a temperature of 1100° C. for 12 hours. The second product was ground. The ground second product was prepared as the second product in a pellet form by the same method as described in Experimental Example 1. The second product in a pellet form had the same size (e.g., a diameter of 10 mm and a thickness of 2 mm) as Experimental Example 1. An oxide-based solid electrolyte was prepared by heat treating the second product in a pellet form at 1200° C. for 24 hours.

COMPARATIVE EXAMPLE 1-2

Preparation of Undoped Oxide-Based Solid Electrolyte

A second oxide-based solid electrolyte in a pellet form was prepared in the same manner as in Experimental Example 1-1. However, aluminum was not added in the present comparative example.

Characterization of Solid Electrolyte

Experimental Example 2-1

Both sides of the second oxide-based solid electrolyte pellet prepared in Experimental Example 1-1 were coated with copper to a thickness of 6 nm to prepare a cell. Electrical conductivity of the second oxide-based solid electrolyte was measured by applying alternating current (AC) impedance in a frequency range of $10^{-1}$ to $10^5$ Hz to the cell. The measurement of the electrical conductivity of the second oxide-based solid electrolyte was performed using a frequency response analyzer (Solatron HF 1225).

Experimental Example 2-2

Ionic conductivity of the solid electrolyte of Experimental Example 1-2 was calculated by performing the same process as in Experimental Example 2-1. As described above, the solid electrolyte of Experimental Example 1-2 included germanium as a doping element.

Experimental Example 2-3

Ionic conductivity of the solid electrolyte of Experimental Example 1-3 was calculated in the same manner as in Experimental Example 2-1. As described above, the solid electrolyte of Experimental Example 1-3 included tin as a doping element.

Comparative Example 2-1

Ionic conductivity of the solid electrolyte of Comparative Example 1-1 was calculated in the same manner as in Experimental Example 2-1. As described above, the solid electrolyte of Comparative Example 1-1 was prepared by a solid phase method.

Comparative Example 2-2

Ionic conductivity of the solid electrolyte of Comparative Example 1-2 was calculated in the same manner as in Experimental Example 2-1. As described above, the solid electrolyte of Comparative Example 1-2 did not include a doping element.

Figure 2:
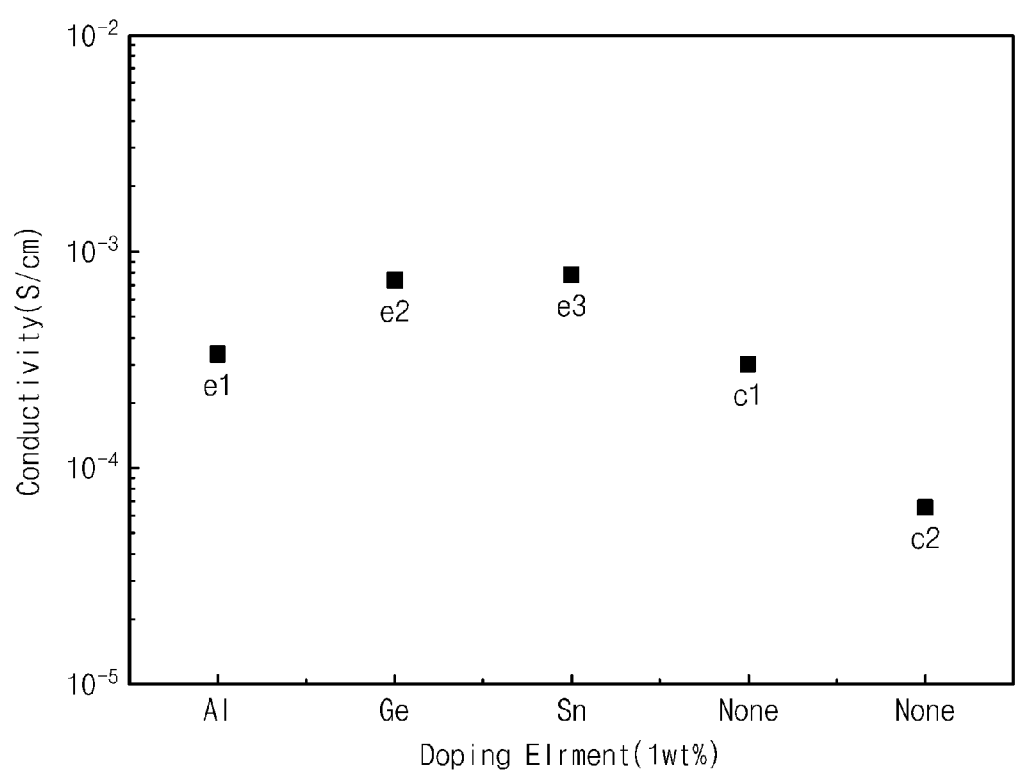
FIG. 2 illustrates the results of evaluating ionic conductivities of experimental examples and comparative examples.

FIG. 2 illustrates the results of evaluating the ionic conductivities of the experimental examples and comparative examples.

Referring to FIG. 2, it may be confirmed that the experimental examples (e1, e2, and e3) exhibited higher ionic conductivity than Comparative Example 2-1 (c1). In the case that the solid electrolyte is prepared by the solid phase method, the lanthanide element, the metallic element, and the lithium element may not be uniformly mixed in the intermediate. As a result, the prepared oxide-based solid electrolyte may have low purity. Also, the preparation of the oxide-based solid electrolyte by the solid phase method may include a heat treatment process at a temperature of 1100° C. or more, for example, 1200° C. The oxide-based solid electrolyte may be deficient in the lithium element under the above temperature condition. Impurities (e.g., $La_2Zr_2O_7$) may be formed under the above temperature condition. The solid electrolytes of the experimental examples may be prepared by a hydrothermal method. With respect to the intermediates prepared by the hydrothermal method, the lanthanide element may be uniformly mixed with the metallic element. As a result, with respect to the oxide-based solid electrolytes of the experimental examples, the lithium element, lanthanide element, metallic element, and oxygen element may be uniformly distributed. Also, the oxide-based solid electrolytes prepared by the hydrothermal method may have a small and uniform size. Since the solid electrolytes of the experimental examples (e1, e2, and e3) were prepared by the hydrothermal method, the solid electrolytes of the experimental examples (e1, e2, and e3) may exhibit high ionic conductivity.

It may be confirmed that the experimental examples (e1, e2, and e3) exhibited higher ionic conductivity than Comparative Example 2-2 (c2). The oxide-based solid electrolyte of Comparative Example 2-2 (c2) may not include a doping element. Since the oxide-based solid electrolytes of the experimental examples (e1, e2, and e3) further included a doping element, the ionic conductivities thereof may be further improved.

An oxide-based solid electrolyte according to the present invention may include a doping element. As a result, the ionic conductivity of the oxide-based solid electrolyte may be increased. A lanthanide element may be well mixed with a metallic element by a hydrothermal reaction. Therefore, with respect to the oxide-based solid electrolyte prepared by the hydrothermal reaction, a lithium element, a lanthanide element, a metallic element, and an oxygen element may be uniformly distributed in the oxide-based solid electrolyte. Crystallization processes of the oxide-based solid electrolyte may proceed at a relatively low temperature and thus, the oxide-based solid electrolyte may be easily prepared. The deficiency of the lithium element in the oxide-based solid electrolyte may be prevented due to the conditions of first and second crystallization processes of the present invention. The deficiency of the lithium element in the oxide-based solid electrolyte of the present invention may be further prevented by controlling a stoichiometric ratio of the added lithium element. The oxide-based solid electrolyte prepared according to the present invention may exhibit high purity and high ionic conductivity.

While preferred embodiments of the present invention has been particularly shown and described with reference to the accompanying drawings, it will be understood by those of ordinary skill in the art that various changes in form and details may be made therein without departing from the spirit and scope of the present invention as defined by the following claims.

What is claimed is:

1. A method of preparing an oxide-based solid electrolyte, the method comprising:
   preparing a precursor solution which includes a lanthanide complex and a metal complex;
   preparing an intermediate by a hydrothermal reaction that is performed on the precursor solution;
   adding a lithium compound and a dopant precursor to the intermediate to prepare a mixture; and
   crystallizing the mixture by:
      preparing a first oxide-based solid electrolyte by performing a first crystallization process on the mixture; and
      preparing a second oxide-based solid electrolyte by performing a second crystallization process on the first oxide-based solid electrolyte,
   wherein the second oxide-based solid electrolyte has a stoichiometric composition that is the same as that of the first oxide-based solid electrolyte, but that has a different crystal structure.

2. The method of claim 1, wherein the hydrothermal reaction of the precursor solution is performed in a temperature range of 120° C. to 240° C. for 2 hours to 48 hours.

3. The method of claim 1, wherein preparing the precursor solution comprises:
   preparing a first precursor solution by adding the lanthanide complex and the metal complex to an acidic aqueous solution; and
   forming precursor precipitates by adding a mineralizer to the first precursor solution.

4. The method of claim 1, wherein the second oxide-based solid electrolyte has a higher ionic conductivity than the first oxide-based solid electrolyte.

5. The method of claim 1, wherein the first oxide-based solid electrolyte has a tetragonal phase, and
   the second oxide-based solid electrolyte has a cubic phase.

6. The method of claim 1, wherein the second oxide-based solid electrolyte has a chemical formula of $Li_{x-y}La_3M_2O_{12-y}$,
   where x is 5 or 7, y is 0.3 to 0.7, and M is any one selected from the group consisting of tantalum, niobium, zirconium, and a combination thereof.

7. The method of claim 1, wherein the first crystallization process is performed in a temperature range of 700° C. to 900° C. for 6 hours to 12 hours.

8. The method of claim 1, wherein the second crystallization process is performed in a temperature range of 1000° C. to 1100° C. for 6 hours to 12 hours.

9. The method of claim 1, wherein the dopant precursor comprises at least one element selected from the group consisting of aluminum, germanium, silicon, gallium, indium, tin, and antimony.

* * * * *